United States Patent [19]
Elliott

[11] Patent Number: 5,303,934
[45] Date of Patent: Apr. 19, 1994

[54] FLUIDIC ACTUATOR SCRAPER SEAL

[75] Inventor: Robert A. Elliott, Atkinson, N.H.

[73] Assignee: General Electric Company, Cincinnati, Ohio

[21] Appl. No.: 66,608

[22] Filed: May 24, 1993

Related U.S. Application Data

[63] Continuation of Ser. No. 885,007, May 19, 1992, abandoned, which is a continuation of Ser. No. 658,263, Feb. 20, 1991, abandoned.

[51] Int. Cl.⁵ ............................................. F16J 15/32
[52] U.S. Cl. .................................. 277/24; 277/58; 277/205
[58] Field of Search .................... 277/173, 177, 58, 59, 277/23, 24, 123, 132, 167.3, 205, 212 R, 212 C, 212 F

[56] References Cited

U.S. PATENT DOCUMENTS

| | | | |
|---|---|---|---|
| 2,214,261 | 9/1940 | Roth | 277/58 |
| 2,307,152 | 1/1943 | Murray | 277/212 F |
| 2,660,493 | 11/1953 | Flick | 277/58 |
| 2,737,404 | 3/1956 | Lapsley | 277/58 |
| 2,815,970 | 12/1957 | Wallace | 277/58 |
| 3,084,945 | 4/1963 | Alexander | 277/24 |
| 3,195,901 | 7/1965 | Mercier | 277/58 |
| 3,216,651 | 11/1965 | King et al. | 277/59 |
| 3,397,893 | 8/1968 | Kampert | 277/24 |
| 3,419,280 | 12/1968 | Wheeler | 277/123 |
| 3,548,721 | 12/1970 | Eisenegger | 277/59 X |
| 3,601,419 | 8/1971 | Fern | 277/205 |
| 3,630,531 | 12/1971 | Bondi | 277/117 |
| 3,655,204 | 4/1972 | Sievenpiper | 277/205 X |
| 3,866,924 | 2/1975 | French | 277/205 |
| 3,869,963 | 3/1975 | Schindel | 92/86 |
| 3,921,991 | 11/1975 | Beck | 277/205 |
| 4,055,107 | 10/1977 | Bartley | 277/24 X |
| 4,093,241 | 6/1978 | Muntjanoff et al. | 277/24 |
| 4,195,849 | 4/1980 | Taft | 277/205 X |
| 4,245,787 | 1/1981 | Freid | 239/265.41 |
| 4,310,163 | 1/1982 | Pippert | 277/205 X |
| 4,476,772 | 10/1984 | Gorman et al. | 277/205 X |
| 4,519,617 | 5/1985 | Butler | 277/58 X |
| 4,627,332 | 12/1986 | Furuta et al. | 277/205 X |
| 4,739,997 | 4/1988 | Smetana | 277/205 X |
| 4,741,509 | 5/1988 | Bunch et al. | 277/205 X |
| 4,809,991 | 3/1989 | Blatt | 277/188 R X |
| 4,867,460 | 9/1989 | Cold et al. | 277/205 X |
| 4,893,823 | 1/1990 | Strouse et al. | 277/58 X |
| 5,165,700 | 11/1992 | Stoll et al. | 277/152 X |

FOREIGN PATENT DOCUMENTS

| | | | |
|---|---|---|---|
| 3540618 | 5/1986 | Fed. Rep. of Germany | 277/24 |
| 0711125 | 9/1931 | France | 277/205 |
| 2068325 | 7/1971 | France . | |
| 0060762 | 5/1980 | Japan | 277/24 |
| 0086960 | 7/1980 | Japan | 277/205 |
| 667141 | 9/1988 | Switzerland . | |
| 0819289 | 9/1959 | United Kingdom | 277/205 |
| 0937399 | 9/1963 | United Kingdom | 277/125 |
| 1009391 | 10/1965 | United Kingdom | 277/58 |
| 1142219 | 2/1969 | United Kingdom | 277/58 |

OTHER PUBLICATIONS

Parker Seal Catalog #PPD3700, Aug. 1, 1989, p. 11.
Seals and Sealing Handbook, 1981, Gulf Publishing Company, p. 199.
Frank Yeaple, "Fluid Power Design Handbook," 1990, pp. 637–649.
Harry L. Stewart et al, "Hydraulic and Pneumatic Power for Production," 1955, pp. 13-35 to 13-38.

*Primary Examiner*—William A. Cuchlinski, Jr.
*Assistant Examiner*—Scott W. Cummings
*Attorney, Agent, or Firm*—Jerome C. Squillaro; Nathan D. Herkamp

[57] ABSTRACT

Dual "U" cup seals are utilized in conjunction with conventional seals as fluidic actuator shaft scrapers for actuators operating in contaminated environments. The seals are installed in serial spaced relation on the low pressure side of the conventional seals such that they scrape contaminants off of the shaft as well as seal against the ingress of contaminants to the high pressure seal area. The scraper configuration may also be of benefit in piston bore seal systems which operate in contaminated fluid environments.

6 Claims, 3 Drawing Sheets

FLUIDIC ACTUATOR SCRAPER SEAL

The U.S. Government has rights in this invention pursuant to Contract No. N00019-88-C-0283 awarded by the Department of the Navy.

This application is a continuation of application Ser. No. 07/885,007, filed May 19, 1992 now abandoned, which is a continuation of application Ser. No. 07/658,263, filed Feb. 20, 1991 now abandoned.

TECHNICAL FIELD

The present invention relates generally to fluidically driven mechanical actuators and more specifically to a scraper and seal apparatus for preventing leakage of the high pressure fluid from said actuators caused by contamination of the high pressure seal.

BACKGROUND INFORMATION

The transmission of power is fundamental to the operation of a broad range of machines and is accomplished by various means, selection being driven for instance by cost or complexity. For example, in some aircraft gas turbine engines, mechanical actuation is required of variable geometry compressor stator systems or variable exhaust nozzle (VEN) systems for those equipped with augmentors. Due to the desirability of minimizing weight and size and maximizing reliability, a typical power transmission arrangement entails regulating the flow of a pressurized working fluid, such as fuel or oil, to a mechanical actuator causing the extension or retraction of a translating shaft. The shaft in turn is connected to a synchronization ring which mechanically drives the variable system to the desired geometry, through a plurality of cams, rollers, and linkages. Such structure is shown, for example, in U.S. Pat. No. 4,425,787 issued to Freid and assigned to the same assignee as the present invention.

It is well known in the art that the control of variable geometry systems in gas turbine engines is fundamental to the proper performance of the engine. Malfunctioning systems can result in among other things degradation of thrust or compressor stalls.

One component of the VEN system which must operate reliably in this particularly hostile environment is the fluidic actuator. Leakage of the working fluid past the seal apparatus which circumscribes the translating shaft, at a minimum, requires maintenance action to maintain a sufficient supply of fluid in the system to keep it operational. Excessive leakage can render a properly filled system inoperable after a short period of time and requires replacement of the actuator. A representative seal apparatus is shown in U.S. Pat. No. 3,630,531 issued to Bondi and assigned to the same assignee as the present invention. The seal is comprised of a resilient member with a recumbent "U" shaped cross section. The radially outer lip of the "U" is biased radially outwardly to form a static seal with the actuator housing bore and the radially inner lip is biased radially inwardly to form a dynamic seal with the translating shaft. The effectiveness of the seal depends among other things on the dimensional size and tolerance of the shaft and housing bore.

A typical VEN, such as that described in the aforementioned Freid patent, is comprised of a plurality of interleaved flap and seal members which cooperate to form a sealed nozzle for all actuator positions. During engine operation, the flaps and seals rub against each other both when the geometry of the nozzle is being changed, as well as when the geometry is fixed, due to aerodynamic buffeting. Due to the relatively high ambient temperature in the VEN cavity, the translatable shaft becomes coated with a sticky, viscous working fluid residue. As the cooperating flaps and seals wear, the resultant fine (abrasive metallic particles) is deposited on the sticky, extended surface of the actuator's shaft. When the shaft is retracted, the particles are drawn into the seal apparatus where it becomes trapped between the shaft and the resilient member. As the actuator cycles, the contamination becomes more severe and the shaft becomes scored along its working length affecting the ability of the resilient member to deform in sealing relationship with the shaft. At intermediate actuator positions, which correspond for example to flight idle or intermediate rated power, where the engine is operated for significant periods of time, localized scoring of the shaft is accelerated. This is because of dithering of the actuator by the control system which is attempting to maintain a fixed VEN geometry against the aerodynamic buffeting forces. What results is a progressive necking of the shaft and therefore increasing leakage at those actuator shaft locations as the clearance between the shaft and resilient member increases beyond the ability of the resilient member to deform in sealing relationship with the shaft.

As is well known in the art, a scraper is often incorporated to remove debris from actuator shafts which operate in dirty environments. It is either formed as part of the resilient member itself or as a separate element disposed between the resilient member and the source of contamination. If a separate element is used, the scraper tends to be of greater hardness than the resilient member and in some cases is metallic; however, the scraper itself must not score the shaft. Contaminants scraped off the shaft eventually collect on the face of the scraper and are forced radially outwardly. As the amount of contamination increases, the particulates are forced around the outer diameter of the scraper and once again build up against the resilient member. While delaying the onset of leakage by reducing the rate of passage of contaminants, the scraper additionally is subject to wear. Eventually, contamination of the resilient member and scoring of the shaft cause the seal apparatus to fail.

OBJECT OF THE INVENTION

Accordingly, the object of the present invention is to provide a fluidic actuator which exhibits extended life in contaminated operating environments by providing a dynamic scraper element proximate the translating shaft and a static sealing element proximate the high pressure seal retainer thereby precluding the passage of contaminants into the high pressure seal area.

SUMMARY OF THE INVENTION

The seal apparatus for a fluidic actuator is comprised in part of a seal assembly configured such that the loading of the pressurized fluid deforms the assembly into dynamic sealing relationship with a translating shaft. Additionally, two sharp-lipped scrapers, which circumscribe the shaft, are mounted in serial, spaced relationship. Each scraper has two lips which are individually biased against the shaft and the high pressure seal retainer for removing contaminants affixed to the translating shaft during retraction, as well as preventing particulate ingress into the seal assembly by sealing at its outer diameter. The spacing between the scrapers forms an annular channel or retention zone in which any contaminants which bypass the outermost scraper are captured thereby significantly extending the useful life of the actuator.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
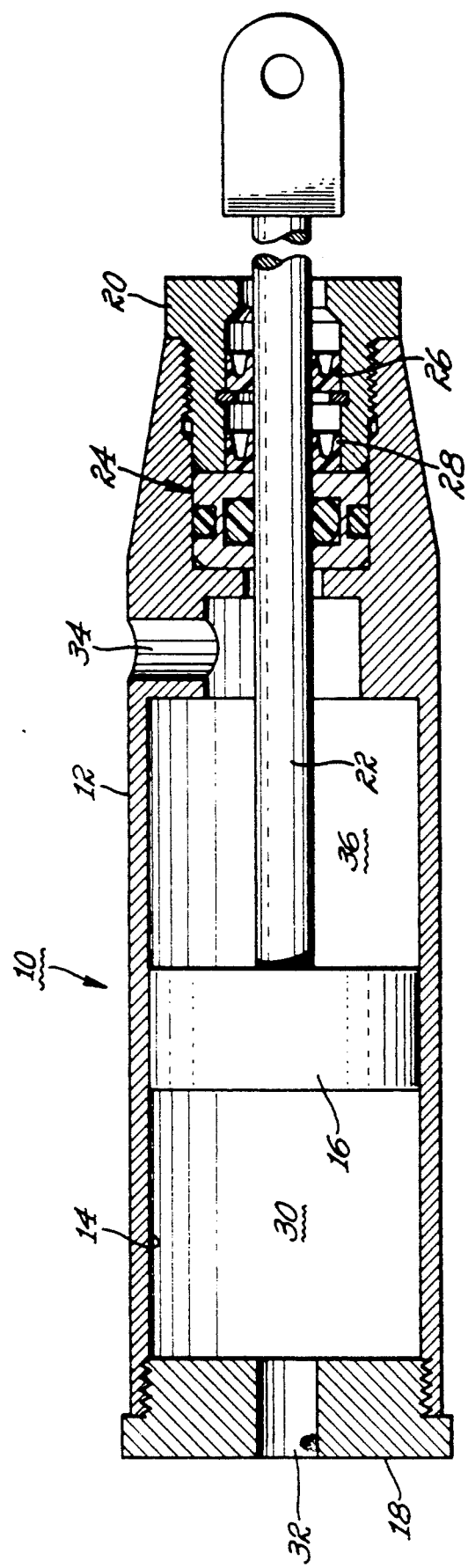
FIG. 1 is a schematic, longitudinal sectional view of a fluidic actuator having a translatable shaft in accordance with one embodiment of the present invention.

FIG. 1 shows an actuator 10 which is comprised of a housing 12 having a cylindrical bore 14 and a piston 16 slidably disposed in said bore 14. The actuator 10 is further comprised of an end wall 18 and a seal retainer 20 each fastened at respective longitudinal ends of the housing 12. A translatable shaft 22 is connected to piston 16 and extends through retainer 20 and seal assembly 24, which prevents leakage of pressurized fluid from within actuator housing 12 around shaft 22. Disposed radially inwardly of the retainer 20 and circumscribing the shaft 22 are a primary scraper 26 and a secondary scraper 28. The shaft extension volume 30 bounded by bore 14, piston 16, and end wall 18 communicates with a pressurized fluid supply (not shown) via fluid port 32. A second fluid port 34 also in communication with a pressurized fluid supply (not shown) communicates with shaft retraction volume 36 bounded by bore 14, piston 16 and seal assembly 24. As can be readily understood, pressurization of extension volume 30 will cause the shaft 22 to extend from the actuator housing 12 or to the right as shown in FIG. 1. In similar fashion, pressurization of retraction volume 36 will cause the shaft 22 to retract into the actuator housing 12 or to the left as shown in FIG. 1. By balancing the forces in extension and retraction volumes 30 and 36 respectively, shaft 22, can be held in any fixed, longitudinal position within the stroke of the actuator 10.

Figure 2:
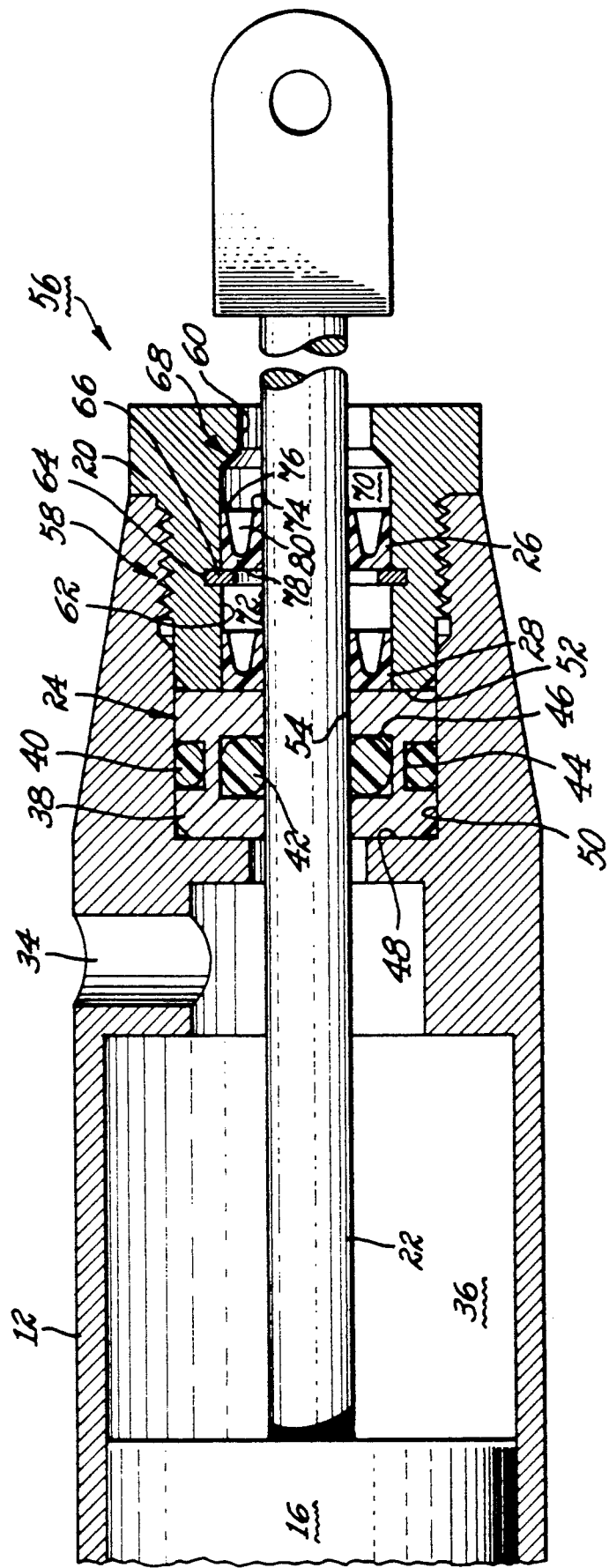
FIG. 2 is a schematic, enlarged, partial, longitudinal sectional view of the shaft seal apparatus of the actuator illustrated in FIG. 1.

FIG. 2 illustrates the subject of the invention in more detail. The seal assembly 24 is of a standard construction as known to those skilled in the art. Briefly, and in simplified form, the assembly 24 is comprised of an end gland 38, a static seal 40 and a dynamic seal 42. The static and dynamic seals 40 and 42 are respectively retained in outer and inner annular grooves 44 and 46 in the end gland 38. The gland 38 is received in the housing 12 and restrained from movement in the longitudinal and radial directions by annular wall 48, bore wall 50 and retainer end wall 52. A gland bore 54 slidably receives shaft 22. During proper operation, the seal assembly 24 prevents leakage of pressurized working fluid from retraction volume 36 to any area external to the actuator housing 12, generally shown at 56.

Further in FIG. 2 is illustrated the retainer 20 threadedly attached to housing 12 at an area generally shown at 58, although a variety of alternate releasable attachment means are suitable. Retainer 20 has a first cylindrical bore 60 and a second concentric cylindrical bore 62 of a larger diameter than the first bore 60. Second bore 62 extends from retainer end wall 52 to the bore transition zone, shown generally at 68, and has a narrow annular slot 64 disposed approximately halfway along its length. That is to say that slot 64 is longitudinally equidistant from wall 52 and the transition zone 68 to the first bore 60. A split retaining ring 66 is removably located in slot 64, which has a larger diameter than that of bore 62. The free state outer diameter of ring 66 is greater than the diameter of bore 62 such that ring 66 be radially compressed prior to insertion into slot 64. Elastic springback of ring 66 ensures its retention in slot 64.

A first annular region 70 is bounded by bore transition zone 68, second bore 62, ring 66 and shaft 22, and in which is retained primary scraper 26. A second annular region 72 is bounded by ring 66, second bore 62, end gland 38 and shaft 22 and in which is retained secondary scraper 28. By way of example, the features and function of primary scraper 26 will be presented which are also representative of secondary scraper 28. Scraper 26 is essentially a "U" cup seal from a class of seals known pusher seals and are well known to those skilled in the seal art. Their use here however as combined dynamic scrapers and static seals is quite unconventional and has proven very successful.

The primary scraper 26 is comprised of two sharp edged cylindrical inner and outer lips shown at 74 and 76, respectively, connected by an annular backing ring 78, the cross section of the scraper resembling a recumbent "U". The scraper 26 is of unitary construction, typically being a molded polymer such as polytetrafluoroethylene. In its free state, the inner and outer lips 74 and 76 are slightly splayed radially inwardly and outwardly respectively so that upon installation in a properly sized annular zone, there is a predetermined pressure loading on the contact surfaces of said zone. Along the interior surface 80 of the inner and outer lips 74 and 76 and the backing ring 78 is disposed an elastically deformed metallic insert (not shown) which further biases the inner and outer lips 74 and 76 into scraping relationship with shaft 22 and sealing relationship with bore 62 respectively. When conventionally used as a seal, the opening of the "U" always exposed to the pressurized fluid which is being sealed. The reaction of the pressure force on the inner and outer lips 74 and 76 augments the spreading force provided by the metallic insert, improving the sealing relationship. By reversing the direction of the "U", it has been discovered that not only does the inner lip 74 adequately remove contaminants affixed to shaft 22 during retraction of shaft 22 into the housing 12, but also that outer lip 76 prevents passage of contaminants which fill the interior surface 80 of the scraper 26 and annular region 70 from bypassing the scraper at its outer diameter along bore 62 into annular region 72. This effectively eliminates the means of contaminant ingress which afflict the prior art. The secondary scraper 28 is disposed in annular region 72 and performs a similar function as scraper 26, especially as scraper 26 wears.

As with conventional sealing applications, the materials utilized, sizes and surface finishes of shafts and bores, and other common criteria in specifying seal design direct the details on element selection and use and are understood by those skilled in the art. In component bench testing, which replicated actual actuator leakage failures at a highly accelerated rate, application of the inventive concepts disclosed herein have demonstrated over a ten times life improvement over the prior art.

Figure 3:
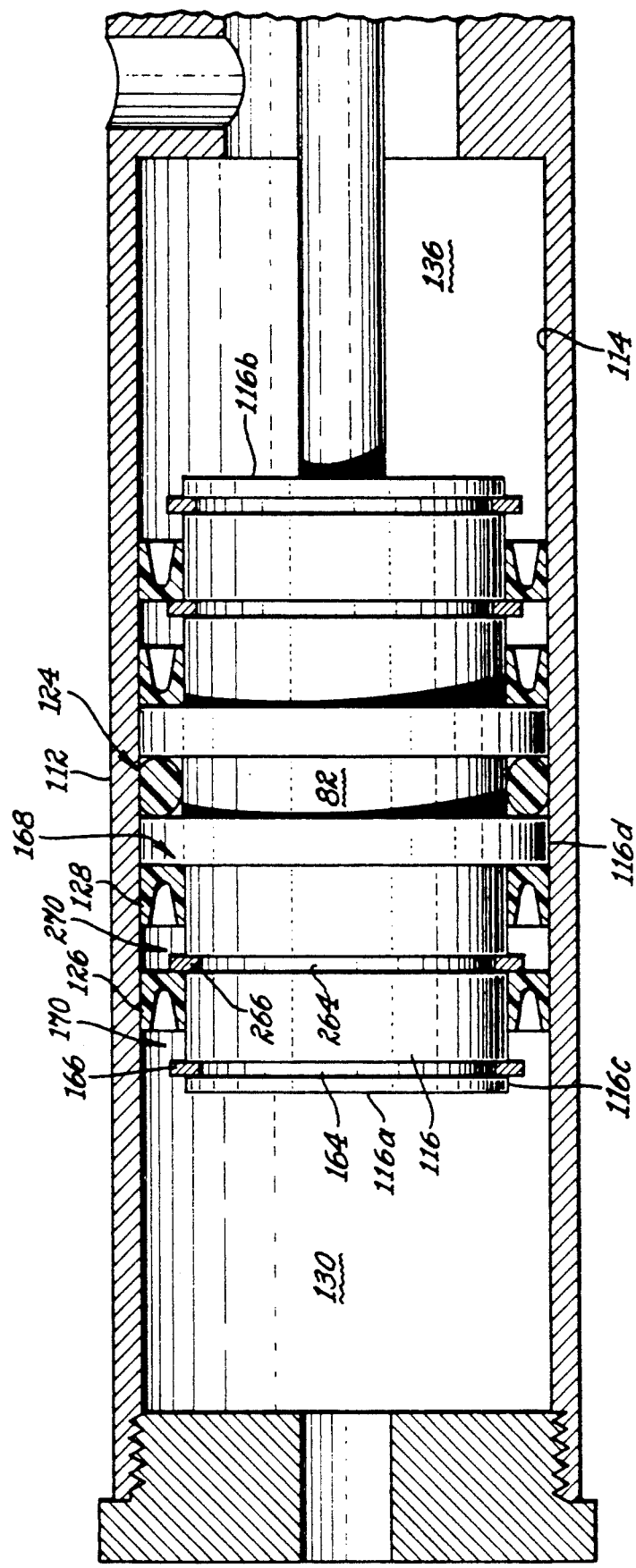
FIG. 3 is a schematic, enlarged, partial, longitudinal sectional view of the piston seal apparatus of the actuator illustrated in FIG. 1 in accordance with an alternate embodiment of the present invention.

The usefulness and application of the teachings of this invention are broader than the shaft seal apparatus configuration shown in FIGS. 1 and 2. For example, FIG. 3 illustrates an alternate embodiment of the invention as a bore seal apparatus for application in an environment where the pressurized working fluid itself is contaminated with abrasive particles. In FIG. 3, a piston 116 of an alternate construction to that shown schematically in FIG. 1 is shown schematically in more detail. Slidably disposed in cylindrical bore 114 of actuator housing 112 is piston 116 having a seal assembly 124 to prevent communication of pressurized working between extension volume 130 and retraction volume 136. The seal assembly 124 is disposed in an annular seal slot 82 located approximately equidistant from the longitudinal end surfaces 116a and 116b of piston 116 which volumes 130 and 136, respectively. Seal assembly 124 is comprised of one or more elements well known to those skilled in the art, for example, "O" rings or "T"

As the configuration of the piston 116 is symmetrical about a radial plane which passes through the longitudinal center of piston 116, for simplicity the following description will address solely the elements of the invention between piston end surface 116a and the radial plane of symmetry.

The outer diameter 116c of piston 116 proximate end wall 116a is less than the inner diameter of cylindrical bore 114. This spaced relationship is required for assembly of the following elements to piston 116. Progressing in the longitudinal direction at the outer diameter 116c of piston 116 starting at and spaced from surface 116a is a first annular slot 164, wherein is disposed a first split retaining ring 166. Following is a first annular region shown generally at arrow 170, in which is disposed a primary scraper 126. Next is a second annular slot 264, wherein is disposed a second split retaining ring 266. Following is a second annular region shown generally at arrow 270, in which is disposed a secondary scraper 128. Scrapers 126 and 128 are similar in configuration and function to scrapers 26 and 28 described hereinbefore. As such, the opening of the recumbent "U"shaped cross section points away from seal assembly 124. Following secondary scraper 128 is a piston diameter transition zone, shown generally at arrow 168 at which location the maximum piston outer diameter 116d is initiated. The aforementioned seal slot 82 and seal assembly 124 are located in this maximum diameter 116d. The size of the elements shown in FIG. 3 are schematic and presented for clarity of illustration. The actual relative sizes would be determined with conventional techniques for the specific application by those skilled in the art.

Alternatively, a simplified embodiment of the invention as disclosed in FIG. 3, would eliminate seal slot 82 and seal assembly 124 from the piston 116, while maintaining longitudinal symmetry of the remaining elements. The use of two pairs of opposed scrapers as depicted without seal assembly 124 provides sufficient scraping and sealing for certain applications. In operation, when retraction volume 136 is pressurized, scrapers 126 and 128 scrape bore 114 as piston 116 translates to the left as shown in FIG. 3, while their symmetrically opposed "U" cup seal counterparts function conventionally as seals. Similarly, when extension volume 130 is pressurized, scrapers 126 and 128 function as seals and their counterparts as scrapers. An additional embodiment of the invention is structurally similar to that in FIG. 1; however, instead of being utilized in an actuator with a translatable shaft, it can be installed in actuators with either rotating or rotationally reciprocating shafts.

While there have been described herein what are considered to be preferred embodiments of the present invention, other modifications of the invention will be apparent to those skilled in the art from the teachings herein, and it is therefore desired to be secured in the appended claims all such modifications as fall within the true spirit and scope of the invention.

Accordingly, what is desired to be secured by Letters Patent of the United States is the invention as defined and differentiated in the following claims:

I claim:

1. An apparatus for sealing between a high pressure zone and a contaminated lower pressure zone, comprising:
 a closed cylindrical housing bounding said high pressure zone and having a wall with a releaseably attached cylindrical retainer, said retainer having an aperture therethrough;
 a shaft of generally circular cross section and having a longitudinal axis extending through said aperture, moveable relative to said retainer along said longitudinal axis;
 a seal means disposed between said wall and said shaft for preventing fluid flow from said high pressure zone to said lower pressure zone;
 a first scraper means on a first side of said seal means proximate said lower pressure zone;
 a second scraper means on said first side of said seal means aligned serially and unopposed with and spaced from said first scraper means for providing a contaminant retention zone therebetween, wherein said seal means and said first and second scraper means are disposed in axial alignment around the longitudinal axis of said shaft; and
 wherein said first and second scraper means are first and second "U" cup seals which are disposed in a bore in said cylindrical retainer such that first and second respective openings of said first and second "U" cup seals are directed at said lower pressure zone; wherein each of said "U" cup seals comprises first and second substantially symmetrical annular sharp edged lips extending symmetrically from an annular backing ring which resiliently biases said first sharp edged lip radially inwardly and said second sharp edged lip radially outwardly into respective scraping and sealing relationship with proximate structure such that a cross-section of said "U" cup seal substantially forms a recumbent "U".

2. The invention according to claim 1 wherein:
 radially inner lips of said first and second "U" cup seals are biased into scraping relationship with said shaft for removing contaminants from said shaft during translation of said shaft relative to said "U" cup seals into said housing: and
 radially outer lips of said first and second "U" cup seals are biased into sealing relationship with said retainer to prevent passage of contaminants from said lower pressure zone to said seal means.

3. The invention according to claim 2 further comprising:
a removable retaining ring disposed in an annular slot in said retainer and radially extending into said bore, said annular slot disposed longitudinally between said first and second "U" cup seals, for preventing contact of said first and second "U" cup seals during translation of said shaft, thereby ensuring maintenance of said retention zone.

4. An apparatus for sealing between a high pressure zone and a contaminated lower pressure zone, comprising:
a wall bounding said high pressure zone;
an elongated member extending through an aperture in said wall generally along a longitudinal axis of said elongated member and moveable relative to said wall;
a seal means disposed between said wall and said elongated member for preventing fluid flow from said high pressure zone to said lower pressure zone;
a first scraper means on a first side of said seal means comprising first and second substantially symmetrical annular sharp edged lips extending symmetrically from an annular backing ring which resiliently biases said first sharp edged lip radially inwardly and said second sharp edged lip radially outwardly into respective scraping and sealing relationship with proximate structure such that a cross-section of said first scraper means substantially forms a recumbent "U";
a second scraper means substantially similar to said first scraper means also on said first side of said seal means aligned serially and unopposed with and spaced from said first scraper means for providing a contaminant retention zone therebetween wherein each of said first and second scraper means independently statically seals against a surface of said wall with said second annular sharp edged lip and independently dynamically scrapes contaminants from a surface of said elongated member with said first annular sharp edged lip preventing passage of contaminants from said lower pressure zone to said seal means;
said seal means, said first scraper means and said second scraper means being retained by said wall; and
said seal means, said first scraper means and said second scraper means being disposed in axial alignment around the longitudinal axis of said elongated member.

5. The invention according to claim 4 wherein said wall comprises:
a cylindrical retainer releaseably attached to a cylindrical housing, said high pressure zone being bounded by said housing; and
further comprising, a piston fixedly attached to said elongated member and slidably disposed in close fitting relation with said housing to divide said high pressure zone into an extension volume and a retraction volume.

6. The invention according to claim 5 wherein said elongated member is a shaft of generally circular cross section.

* * * * *